Figure 1:
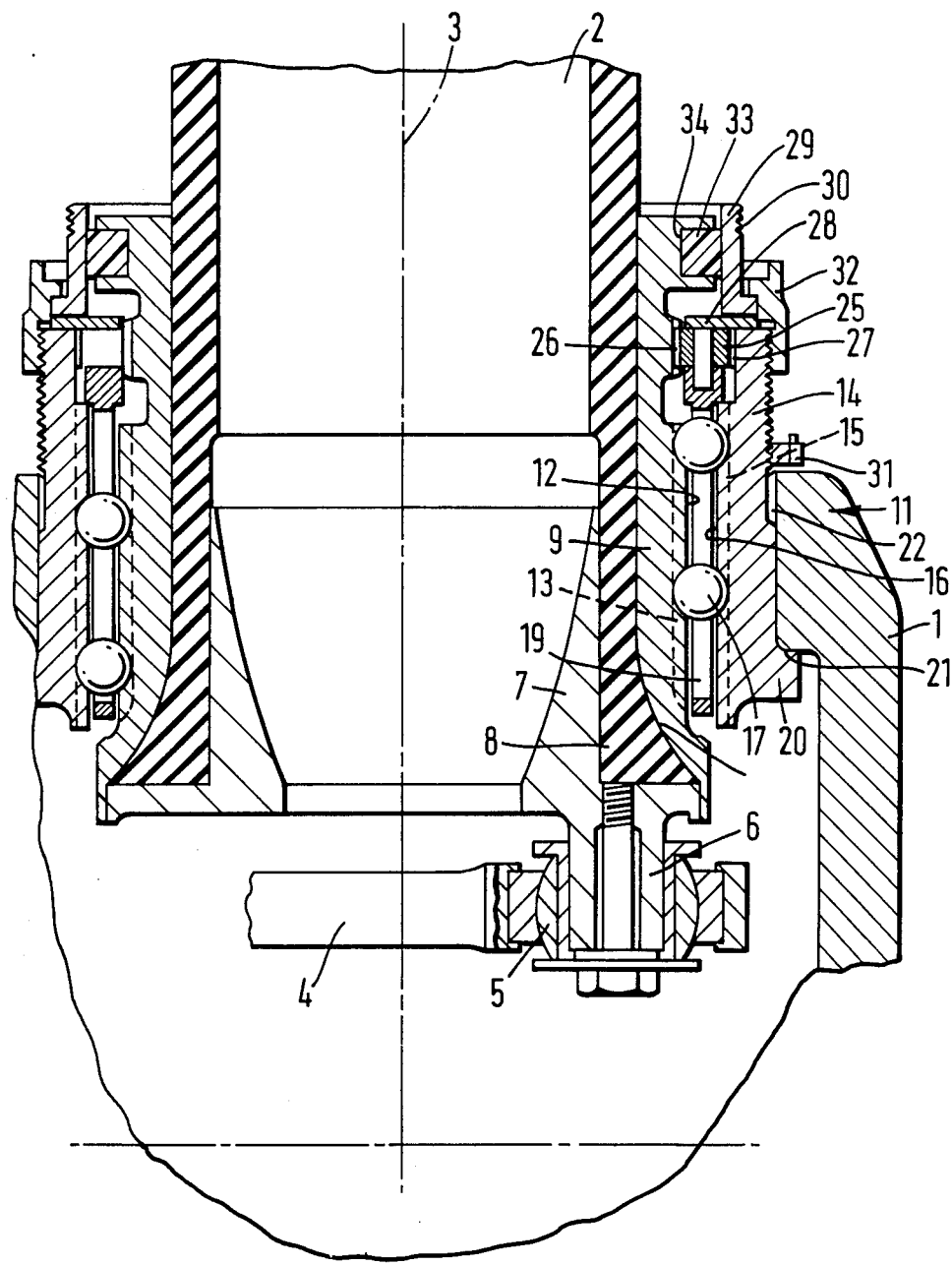

United States Patent [19]

Seeley

[11] Patent Number: 4,717,312

[45] Date of Patent: Jan. 5, 1988

[54] VARIABLE-PITCH BLADED ROTORS

[75] Inventor: Roger W. Seeley, Cheltenham, England

[73] Assignee: Dowty Rotol Limited, Gloucester, England

[21] Appl. No.: 879,999

[22] Filed: Jun. 30, 1986

[30] Foreign Application Priority Data

Jul. 10, 1985 [GB] United Kingdom ............... 8517474

[51] Int. Cl.⁴ .................................... B64C 11/32
[52] U.S. Cl. ................................. 416/145; 416/89; 416/147; 416/205
[58] Field of Search ................... 416/144–145, 416/220 R, 220 A, 89, 147, 205

[56] References Cited

U.S. PATENT DOCUMENTS

| | | | |
|---|---|---|---|
| 2,307,101 | 1/1943 | Blanchard et al. | 416/145 X |
| 2,423,400 | 7/1947 | Nichols | 416/160 X |
| 2,425,938 | 8/1947 | Hoover | 416/147 X |
| 2,460,559 | 2/1949 | Wildhaber | 416/89 |
| 2,514,477 | 7/1950 | Cushman | 416/89 |
| 2,518,431 | 8/1950 | Wildhaber | 416/89 |
| 2,533,358 | 12/1950 | Cushman | 416/89 |
| 2,566,696 | 9/1951 | Cushman | 416/89 |
| 3,794,442 | 2/1974 | McMurtry | 416/145 |

FOREIGN PATENT DOCUMENTS

| | | | |
|---|---|---|---|
| 798926 | 5/1936 | France | 416/133 |
| 821543 | 12/1937 | France | 416/147 |
| 2145777 | 4/1985 | United Kingdom | 416/162 |

Primary Examiner—Everette A. Powell, Jr.
Attorney, Agent, or Firm—Hayes, Davis & Soloway

[57] ABSTRACT

A variable-pitch bladed rotor including a plurality of blades extending outwardly from a hub in which they are each mounted by a respective ball-screw device. Each device comprises inner and outer races each provided with at least one helical groove, a plurality of balls co-operable with the grooves, and a cylindrical cage disposed between the races which is suitably apertured for accommodation of the balls. The cage supports gearing so associated with the inner and outer races that on pitch-change movement of the respective blade the cage is positively driven, thereby to turn about the blade longitudinal axis.

7 Claims, 3 Drawing Figures

VARIABLE-PITCH BLADED ROTORS

This invention relates to variable-pitch bladed rotors, for example propellers for aircraft, aircushion craft and the like.

Such variable-pitch bladed rotors include a plurality of blades mounted for pitch-change movement with respect to the hub of the rotor and in operation of the rotor fine-pitch-seeking centrifugal twisting moments inherent in the blades require to be overcome in order for the blades to be moved, for example by an hydraulically-operable pitch-change motor, in the pitch-coarsening direction. In certain such rotors counterweights are provided in association with the blades which during operation have the effect of biassing the blades in the coarse-pitch-seeking direction in opposition to the inherent centrifugal twisting moments. However, the provision of such counterweights is not without substantial weight penalties.

In certain other such variable-pitch bladed rotors the blades have been mounted for their pitch-change movement with respect to the hub by means of ball-screw devices. On operation of a suitable pitch-change motor, and thus turning of the blades about their longitudinal axes, the blades have, by virtue of the ball-screw devices, moved radially outwardly or inwardly, in dependence on the direction of pitch-change, with respect to the hub thus effecting a slight increase or a slight decrease, as the case may be, in the overall diameter of the rotor.

The centrifugal force on each ball-screw device during rotor operation has two components, one normal and the other tangential. The first is absorbed by the balls of the device which co-operate with spiral grooves, while the tangential component is so directed as to oppose the fine-pitch-seeking centrifugal twisting moments inherent in the blades.

However, with such bladed rotors it has been found that often under the high centrifugal loading on the ball-screw devices the balls thereof have been caused to crowd towards the radially-outward ends of their grooves which is detrimental to the bearing support afforded at the radially-inward ends of their grooves.

The invention as claimed is intended to provide a remedy. It solves the problem of how to design a variable-pitch bladed rotor in which such crowding of the balls of a ball-screw device is avoided.

According to this invention a variable-pitch bladed rotor includes a hub provided with a plurality of blades extending outwardly therefrom, each of said blades being mounted in the hub by means of a respective ball-screw device comprising an inner race provided with at least one helical groove, an outer race provided with at least one helical groove, a plurality of balls co-operable with said grooves and a cylindrical cage disposed between said races which is suitably apertured for accommodation of said balls, said cage supporting gearing so associated with said inner and outer races that on pitch-change movement of the respective blade said cage is positively driven, thereby to turn about the blade longitudinal axis.

Preferably the apertures of said cage comprise a plurality of slots running lengthwise thereof which are of equal length, radiussed at their ends and equispaced circumferentially of the cage.

Preferably also said gearing includes a plurality of pinions each mounted for rotation on said cage with its axis of rotation parallel to said longitudinal axis of the blade, these pinions being equispaced circumferentially of the cage and being in meshing engagement with a ring of external gear teeth carried by, or formed integrally with, the outer surface of said inner race, and in meshing engagement with a ring of internal gear teeth, carried by of formed integrally with, the inner surface of said outer race.

The pinions may be so mounted on said cage at one end thereof, each upon a respective pin fast with the cage.

The helical grooves of said inner race and said outer race may each extend through substantially two turns.

Each blade may be of composite construction, part thereof being of reinforced plastics material. In this case at its root end the blade may be of outwardly flared form for retention between two sleeve members, the outer sleeve member forming said inner race.

The advantages afforded by the invention are mainly that since crowding of the balls in their grooves under centrifugal force is avoided blade stability is substantially improved, a hub of smaller diameter is possible and since the provision of coarse-pitch-seeking counterweights is avoided a spinner of smaller diameter can be used in association with the bladed rotor.

Figure 2:
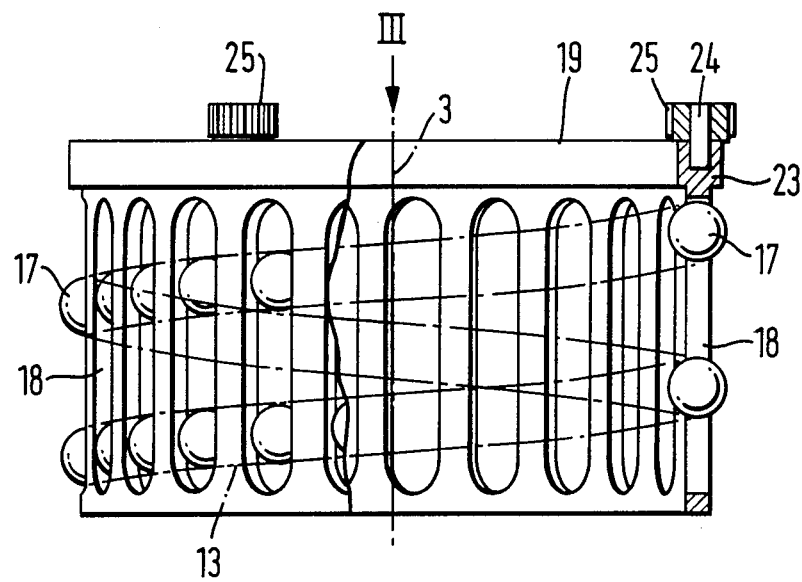
Figure 3:
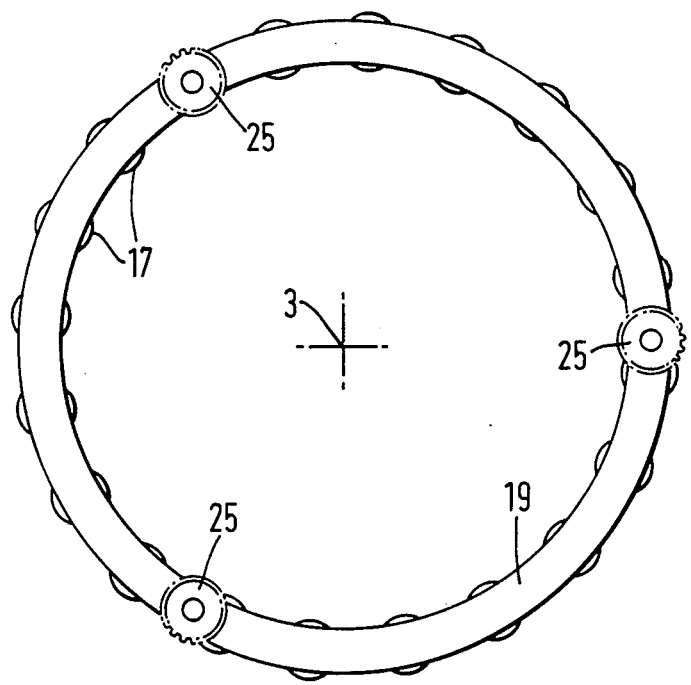

One embodiment of the invention will now be described by way of example with reference to the accompanying drawings, of which:

FIG. 1 is a cross-sectional elevation of a blade root and bearing assembly of a variable-pitch bladed rotor in accordance with the invention, FIG. 2 is a cross-sectional elevation of a cage forming part of the construction shown in FIG. 1, and, FIG. 3 is a view taken in the direction of the arrow III in FIG. 2.

In the drawings a bladed rotor, which forms a variable-pitch propeller for an aircraft, comprises a hollow one-piece aluminium hub which is partly shown at 1, and four blades part of one of which is shown at 2. Each blade is mounted in the hub for pitch-change about its longitudinal axis 3 by an hydraulically-operable pitch-change motor (not shown) coupled to all the blades through respective link members 4. Each of these members is ball-jointed at 5 to respective crank pin 6 carried eccentrically at the base of a steel sleeve member 7.

Each blade 2 is of composite construction, part thereof being of reinforced plastics material. The root end 8 in this material is of outwardly flared form for retention between sleeve member 7 and a further steel sleeve member 9 suitably correspondingly flared at 10 on its inner surface towards its radially-inner end.

Member 9 forms the inner race of the blade root bearing which comprises a ball-screw device 11. In its cylindrical outer surface 12 member 9 is provided with a helical groove 13 substantially of semi-circular cross-section. Device 11 also includes a steel sleeve member 14 forming an outer race and provided with a helical groove 15 substantially of semi-circular cross-section on its cylindrical inner surface 16, and, a plurality of balls 17 which are co-operable with grooves 13 and 15.

The grooves extend through substantially two turns in this embodiment in their respective races 9, 14 and the balls are accommodated in slots 18 in a cylindrical cage 19 disposed between the races. These slots run lengthwise of the cage, are of equal length, are radiussed at their ends and are equispaced circumferentially of the cage.

Race 14 is provided with a flange 20 which engages step 21 in hub 1, that race being splined at 22 into the hub.

The construction of cage 19 is shown more clearly in FIG. 2, the cage being fitted to the hub prior to the bonding of the flared root end 8 between member 7 and race 9.

The upper surface of the cage is drilled as at 23 to receive three pins 24 which are equispaced circumferentially of the cage and which carry respective pinions 25. These pinions are rotatable on their pins about axes which are parallel to axis 3, are in meshing engagement with a ring 26 of external gear teeth formed integrally with the outer surface of the inner race 9, and are in meshing engagement with a ring 27 of internal gear teeth formed integrally with the inner surface of the outer race 14.

A split bearing plate 28 engages the pinions 25, and a flanged sleeve 29 which is suitably externally threaded at 30 to facilitate balancing is in engagement with plate 28.

A locking ring 31 is screwthreadedly fitted to outer race 14 as shown to lock that race to hub 1 and a further locking ring 32 is also screwthreadedly fitted to race 14 to hold the sleeve 29 and plate 28 in correct assembly as shown in FIG. 1.

A sealing ring 33 is fitted in groove 34 and is co-operable with the bore of sleeve 29.

The outer race 14 is, by this construction, fixed with respect to the hub while the inner race 9 turns with the blade during pitch-changing movements in operation of the propeller. The normal component of centrifugal force on each ball-screw device 11 is absorbed or reacted by the balls 17 in their co-operation with groove 15 while the tangential component arising from the centrifugal force is so directed as to oppose the fine-pitch-seeking centrifugal twisting moments inherent in the blades.

During pitch-changing movement the pinions 25 which are differentially driven by the inner and outer races 9, 14 cause the cage to turn at one half the speed of the blade itself. This, coupled with the fact that the slots 18 have a restraining effect on the movements of the balls 17 in their helical grooves, means that the balls remain evenly spaced in those grooves irrespective of the centrifugal force acting upon them. Thus crowding of the balls towards the radially outer ends of their races is avoided and therefore blade stability is substantially improved.

The ball-screw devices 11 so fitted provide coarse-pitch-seeking turning moments on the blades otherwise provided by counterweights. Thus a substantial saving in weight is achieved. The provision of ball-screw devices is of particular advantage in large propellers where the size of counterweights becomes prohibitive.

The coarse-pitch-seeking turning moment at any one propeller rotational speed is constant, or substantially so, irrespective of blade angle, whereas with counterweights they are adequately effective only over a relatively small range of blade angles.

The track pitch of the ball-screw devices is determined by designed propeller maximum speed, blade weight and the turning moment required for pitch-change. For example, a pitch of approximately 1.25 inches may be used on a four-bladed propeller of 11 feet diameter for use with an engine delivering a maximum shaft horsepower of 1800.

Although in the embodiment above described with reference to the drawings the cage 19 is fitted prior to bonding of the flared root end 8 between member 7 and race 9, in alternative embodiments of the invention the cage can be diametrally split and the two parts rivetted or welded around the blade root during sub-assembly.

By this invention not only is the rotating weight of the propeller considerably reduced but a more simple control system can be used in association with the propeller. In some cases the need for a feathering pump for moving the blades to their feathered angle may be eliminated, a light spring in the hub being all that is necessary to bring the blades to this position.

The construction is such that the need for a split hub can be eliminated and such that blade changes can readily be achieved in service.

Again, although in the embodiment above described with reference to the drawings three pinions 25 are provided of the cage 19, in alternative embodiments of the invention any other suitable number of pinions may instead be provided.

In other embodiments of the invention the ball-screw devices may be employed in bladed rotors where the blades are necessarily fitted with counterweights, for example blades which are themselves exceptionally light in weight. In this case the effect of the ball-screw devices is additive to the effect of the counterweights in biassing the blades in the coarse-pitch-seeking direction.

By the invention centrifugal force acting on the cage 19 is reacted by the hub 1 through the intermediary of the plate 28, sleeve 29 and ring 32, and is not imparted to the balls 25.

Further, although in the embodiment above described with reference to the drawings pitch-change of the blades of the rotor is effected by an hydraulically-operable pitch-change motor (not shown) coupled to all the blades through link members 4, instead in alternative embodiments of the invention each blade is at its root end portion provided with its own individual hydraulically-operable pitch-change motor so as to be directly operable thereby, all the motors being so included in an associated hydraulic pitch-control system as to be capable of effecting pitch-changing of all the blades simultaneously.

Finally, instead of such pitch-change motor or motors being of hydraulically-operable type they may be of suitable electrically-operable, pneumatically-operable or electro-hydraulically-operable type.

I claim:

1. A variable pitch bladed rotor which comprises
a hub having a plurality of ball-screw means mounted thereon and from which a plurality of blades extend;
wherein a ball screw means includes
an inner race having at least one helical groove formed therein;
an outer race having at least one helical groove formed therein;
a passage defined between the helical grooves;
a rotatably driveable cylindrical cage disposed between the inner and outer races which has longitudinal slots formed therein;
a plurality of balls positioned in said passage and within the confines of the slots and movable longitudinally with respect thereto; and
drive means forming a part of the cage to drive the cage on a pitch change movement.

2. A rotor as claimed in claim 1, wherein said slots are of equal length, radiussed at their ends and equispaced circumferentially of the cage.

3. A rotor as claimed in claim 1, wherein said drive means includes a plurality of pinions each mounted for rotation on said cage with its axis of rotation parallel to said longitudinal axis of the blade, these pinions being equispaced circumferentially of the cage and being in meshing engagement with a ring of external gear teeth provided upon the outer surface of said inner race, and in meshing engagement with a ring of internal gear teeth provided upon the inner surface of said outer race.

4. A rotor as claimed in claim 3, wherein said pinions are so mounted on said cage at one end thereof, each upon a respective pin fast with the cage.

5. A rotor as claimed in claim 1, wherein the helical grooves of said inner race and said outer race each extend through substantially two turns.

6. A rotor as claimed in claim 1, wherein each blade is of composite construction, a part thereof being of reinforced plastics material.

7. A rotor as claimed in claim 6, wherein at its root end each blade is of outwardly flared form for retention between two sleeve members, the outer sleeve member forming said inner race.

* * * * *